ively reciprocating two cross slide tables which
United States Patent [19]
Nicolaus et al.

[11] 3,797,175
[45] Mar. 19, 1974

[54] SPIRAL AND RADIAL RELIEF GRINDING FIXTURES WITH COAXIAL PLANETARY DIFFERENTIAL DRIVE

[75] Inventors: Frank G. Nicolaus; Charles T. Breitenstein, both of Chicago, Ill.

[73] Assignee: Spiral Step Tool Company, Elk Grove Village, Ill.

[22] Filed: Sept. 20, 1972

[21] Appl. No.: 290,742

Related U.S. Application Data

[63] Continuation-in-part of Ser. No. 182,757, Sept. 22, 1971, abandoned.

[52] U.S. Cl. .................... 51/95 LH, 51/219, 51/232
[51] Int. Cl. ............................................. B24b 3/24
[58] Field of Search ............. 51/219 PC, 219 R, 225, 51/232, 95 R, 95 LH

[56] References Cited
UNITED STATES PATENTS

| | | | |
|---|---|---|---|
| 2,330,921 | 10/1943 | Rickenmann | 51/225 |
| 2,408,949 | 10/1946 | Pelphrey | 51/33 W |
| 2,471,539 | 5/1949 | Parker | 51/232 |
| 2,585,986 | 2/1952 | Andreasson | 51/95 LH |
| 3,736,113 | 5/1973 | Limbdenstock et al. | 51/232 X |

FOREIGN PATENTS OR APPLICATIONS

| | | | |
|---|---|---|---|
| 363,036 | 7/1921 | Germany | 51/95 LH |

*Primary Examiner*—Harold D. Whitehead
*Assistant Examiner*—Nicholas P. Godici
*Attorney, Agent, or Firm*—Callard Livingston

[57] ABSTRACT

Cooperative driving and driven grinding and form-relieving fixtures are disclosed suitable for selective spiral grinding with both radial and end relief on spiral or straight-fluted tools such as drills, reamers, end mills, counter bores, and the like. The driving fixture embodies a differential modulating system including a single power shaft completely traversing the rotative axis of the carrier or housing of a novel differential gear unit which is coupled to the relieving fixture by concentric independently separable coupling cranks, one of which transmits the differentially modulated motor driving torque to a work spindle, and the other of which transmits a constant motor shaft torque to a sine-bar cam system on the relieving fixture for simultaneously reciprocating two cross slide tables which mount the work spindle and impart simultaneously longitudinal and lateral or radial motions to the work spindle while the latter is being rotated through the differential drive system. The concentric crank means can be selectively decoupled and/or the differential modulation can be adjusted to procure a variety of complex or simple motions of the work spindle.

14 Claims, 18 Drawing Figures

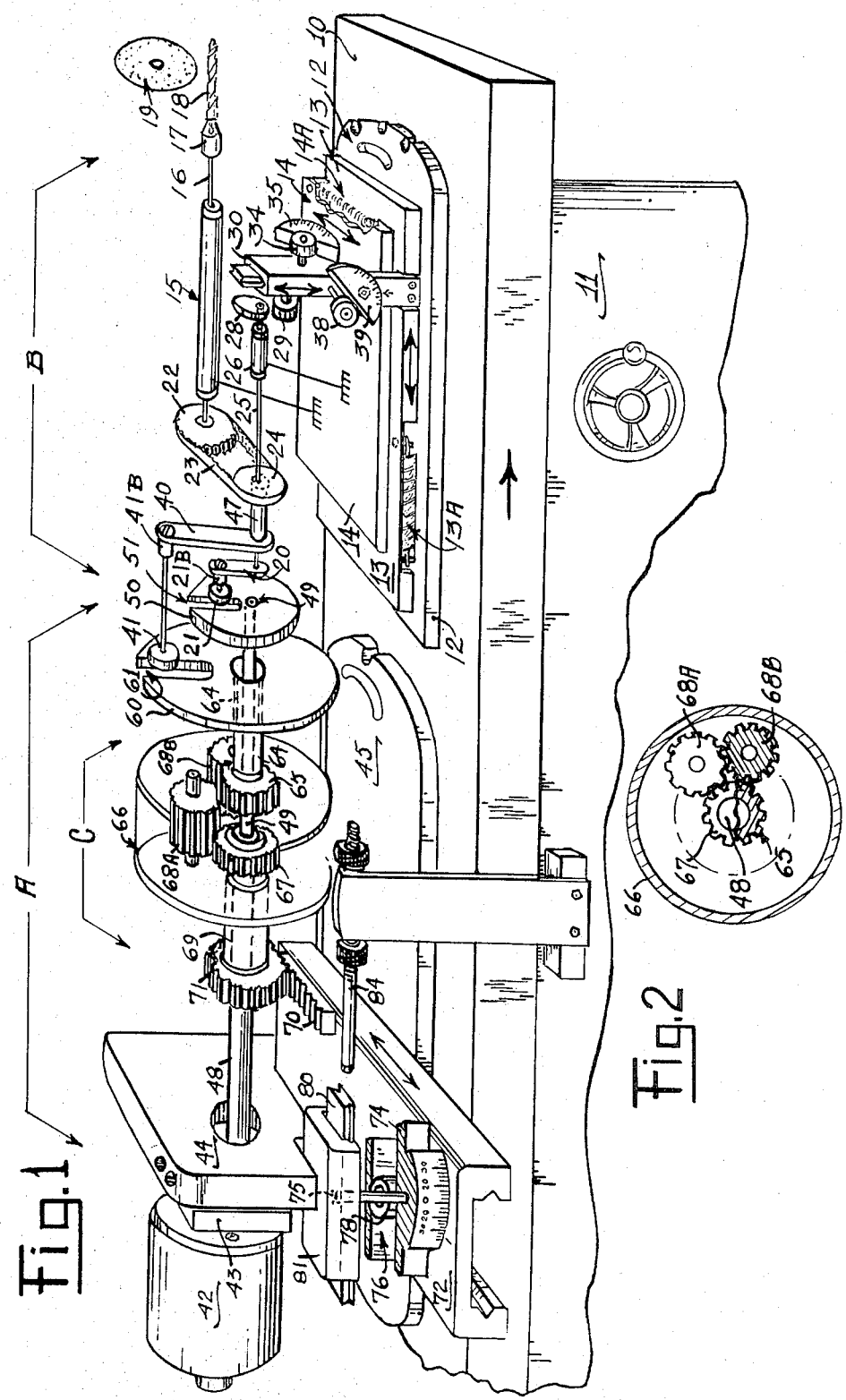

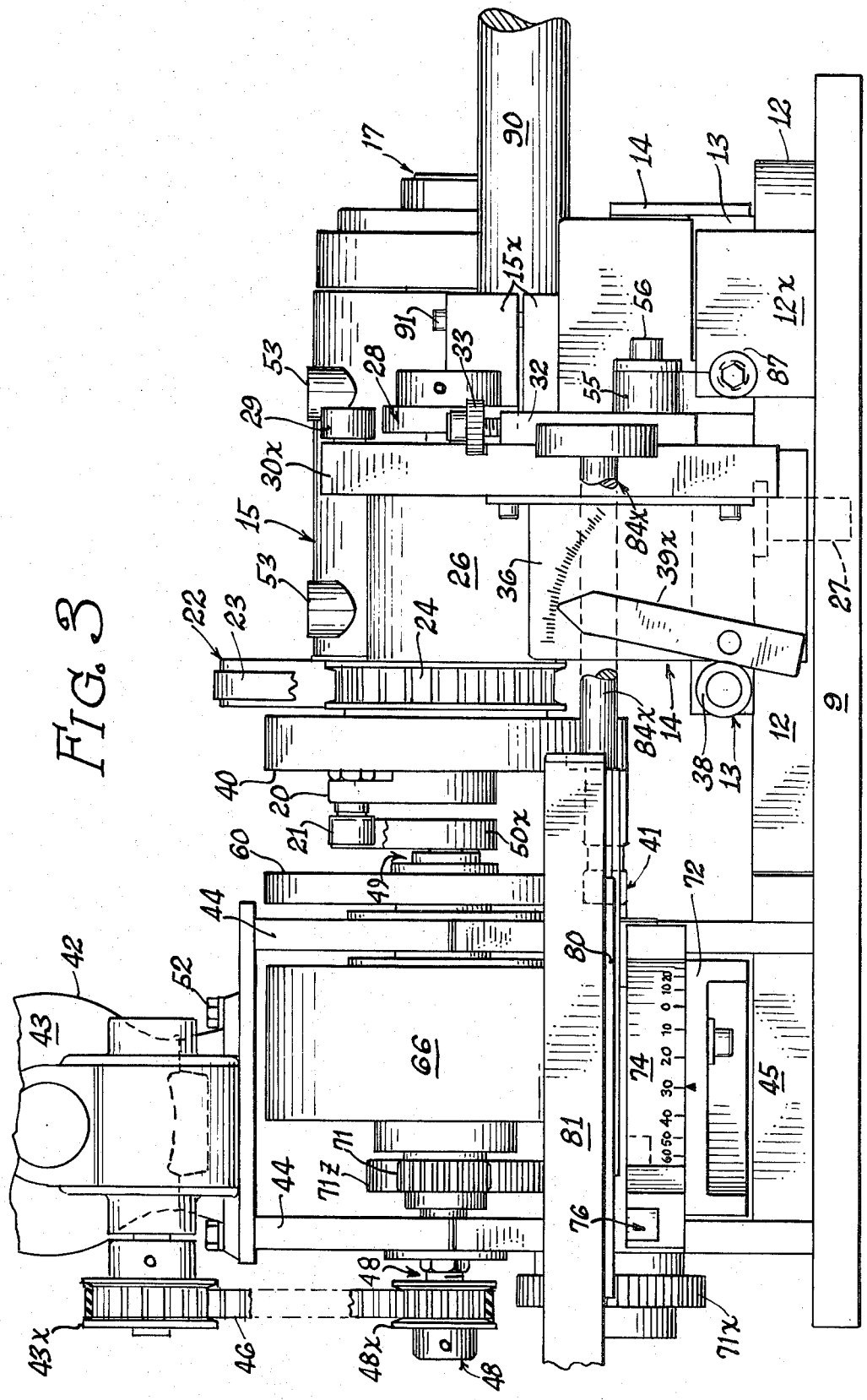

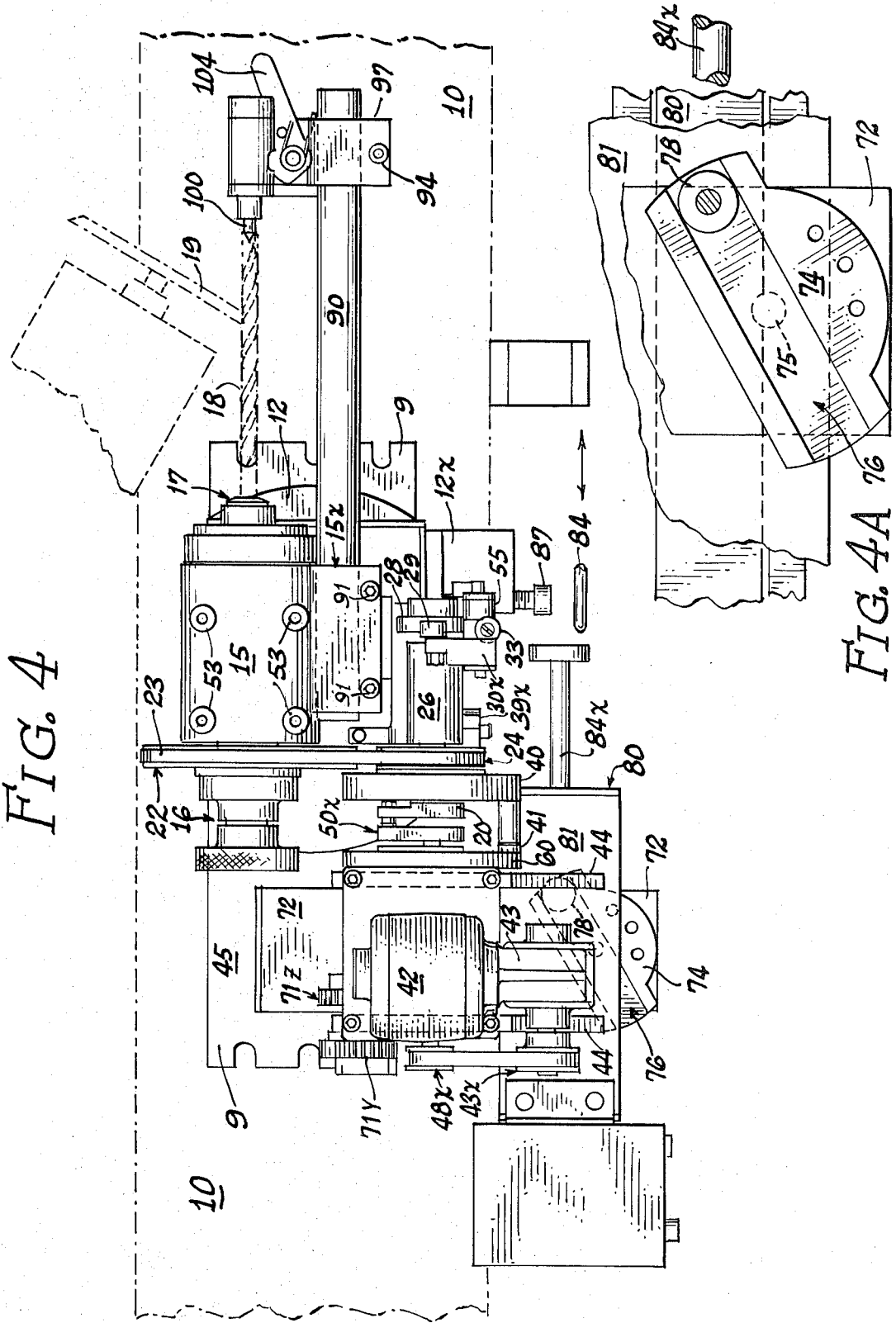

SPIRAL AND RADIAL RELIEF GRINDING FIXTURES WITH COAXIAL PLANETARY DIFFERENTIAL DRIVE

This application is a continuation-in-part of Ser. No. 182,757 filed Sept. 22, 1971, now abandoned.

This invention relates to abrading and grinding machines and has as its principal object the provision of cooperative driving and driven grinding fixtures for use in form-relief grinding of spirally and straight-fluted drills, step drills, reamers, end mills, taps, and the like requiring complex motion including rotation with complex longitudinal and lateral or radial displacements as well as helical progression of the work piece relative to a grinding wheel or the like.

In accordance with prior practice, many types of grinding equipment have been provided for the purpose of procuring radial relief, but apparatus capable of affording such relief along spiral fluting has been restricted to large machines having relatively complicated systems for deriving the helical component and other motion components from a single source of driving power, one such machine being disclosed in U. S. Pat. No. 2,792,676 to Umbdenstock, which provides a large and costly machine for spiral and form relief grinding in which the spiral lead from carriage movement is provided by a special helical ball-screw shaft differentially overdriven by axial thrust derived from the machine carriage.

Another large machine type of helical over-driving means is found in U. S. Pat. No. 2,452,702 to Umbdenstock wherein a torque is imparted to a helical gear on the spindle drive shaft by another helical gear shifted by axial thrust thereon derived from carriage travel.

The foregoing helical-thrust types of over-drive for producing spiral motion are distinguished from conventional differential drives of the planetary type, such as exemplified in the German Patent to Zimmermann Werke No. 363,036 (1921) wherein the turning of a shaft 5 imparts rotation to the live-center spindle 13. A form of sine bar 9 shifts a rack 19 to turn the differential carrier. The spindle 13 is not constantly rotating, but only slightly turned as the spiral helix advances to follow the grinding wheel 2. The purpose of the sine bar over-drive is to cause the wheel to cut evenly in both directions of carriage travel by compensating for play in the gear drive when the direction is changed.

Another example of differential drive is found in U. S. Pat. No. 2,330,921 to Rickenmann, wherein a shaft 31 rotates a live center spindle 10 through a set of gears, and a longitudinally travelling rack 43 moving with the carriage imparts additional turning to a shaft 25 driving the spindle gear system as the result of turning of a gear carrier housing 32 through a special train of gears 33, 34, 35, 36, 37, 40, 42, which governs the motion of the work spindle, the purpose of this form of differential being to compensate for ratio mismatch when suitable gears are lacking to change the special gear train for a particular job.

Such prior differential arrangements are obviously more complex than applicants' and do not achieve the compact concentric differential and direct drive means for producing the complex relieving motions afforded by the disclosed improvements.

Relieving fixtures are also known wherein a workhead is shifted radially and axially by the use of driving cams actuated from a single power drive, as for example in U. S. Pat. No. 2,471,539 to Parker wherein a special cam 41 rotating with the work spindle causes axial shifting of the latter on rods and additional lateral displacement is derived from this motion by cam means engaging a sine bar 14 to shift a subcarriage 20 transversely. The actuating power here is both applied to and derived from the work spindle, and a special changeable cam 41 is required for each job.

A similar relieving motion is disclosed in U. S. Pat. No. 2,584,483 to McDonald wherein a work spindle 14 is carried on a rocking head structure 11, 12, 33. Rotation of a cam 44 by the motor gears causes a thrust reaction on cam 53 which shifts the head longitudinally, and this motion in turn imparts a rocking of the head as the result of movement of cam 63 against roller 67.

Still another form of relieving fixture is exemplified in U. S. Pat. No. 2,752,740 to Mouw, wherein all of the axial and lateral head movements are derived from the rotation of the work spindle 60 through a right-angled system of cam rollers 76 and 77 carried on a bell crank 75 in contact with a special multilobe template type of cam 63 on the work spindle, different cams being required for different jobs.

According to the invention, there is provided a driving fixture and a grinding fixture cooperative therewith in a predetermined coaxial juxtapositioning thereof, said driving fixture having coaxially rotatable primary and secondary output drives, the primary drive being directly rotated from a primary shaft motor-driven at selected constant speed and the secondary output drive being differentially driven from the primary shaft by planetary differential gear means arranged in a carrier which is axially penetrated by and coaxially rotatable about said primary shaft and which constitutes the driving source of said secondary output drive, said carrier being rotatable by modulating drive means to modify the speed of said secondary output drive from said constant speed; the grinding fixture including a headstock with work spindle carried by table means reciprocable axially and radially of the work spindle axis and carrying translating sine drive means for reciprocating the table means together with coaxial rotary primary and secondary input drives coupling with the corresponding primary and secondary output drives of the driving fixture in the coaxial juxtapositioned relationship aforesaid, said primary input drive driving said translating sine drive means and said secondary input drive driving said work spindle.

A further feature of novelty is the transmission of the driving power from the differential means and motor shaft through two concentric output crank arrangemets which rotate in opposite directions and are separably coupled with mating input crank means on the grinding fixture to transmit the two kinds of driving torque to the work spindle and constant drive to the sine bar cam system for reciprocating the table slides.

Another feature of novelty resides in the provision of a very compact sine bar type of modulating slide mechanism for modulating the differential drive means characterized in that a sine block is pivotally supported from an overhead slide and has a camming channel serving as a race for a roller affixed to a cross slide. By changing the angular setting of the overhead sine block, the cross slide will be displaced more or less as the result of advance of the machine carriage with the aid of a stop element which in effect holds the sine block slide against travel with the machine carriage and thereby causes a camming action with the differential cross slide roller to shift the latter and apply torque to the differential housing, as will more fully appear.

The foregoing and other aspects of novelty and utility are illustrated in the annexed drawings in which:

FIG. 1 is a schematic depiction of essential structural and operational relationships of the components of the apparatus;

FIG. 2 is a cross-sectional schematic detail illustrative of the basic gear plan characterizing the differential drive means;

FIGS. 3 to 17 depict details of a preferred embodiment of the apparatus in which FIG. 3 is a front elevation thereof;

FIG. 4 is a top plan view thereof;

FIG. 4A is an enlarged detail of parts seen in FIG. 4;

FIG. 5 is a vertical cross section of the apparatus;

FIG. 6 is an elevation thereof at the left of FIG. 5;

FIG. 7 is a fragmental lateral cross section at lines 7—7 of FIG. 5;

FIG. 8 is an exploded schematic of the power gear train of the driving unit;

FIG. 9 is a cross-sectional detail through the differential unit equipped with dual sets of planet gears looking along lines 9—9 of FIG. 5;

FIG. 10 is a median section through the differential unit looking along lines 10—10 of FIG. 9;

FIG. 11 is a transverse section along lines 11—11 of FIG. 5;

Figure 13:
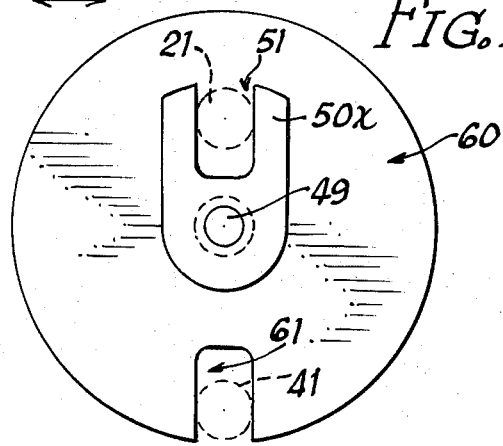
Figure 12:
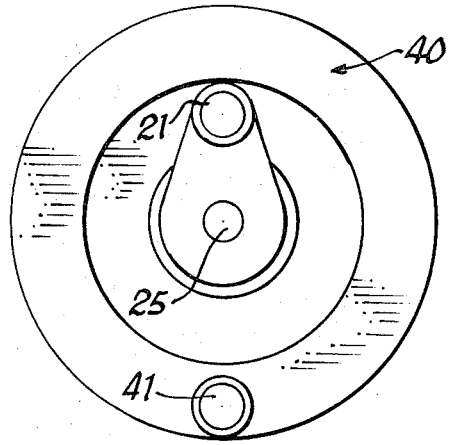
Figure 14:
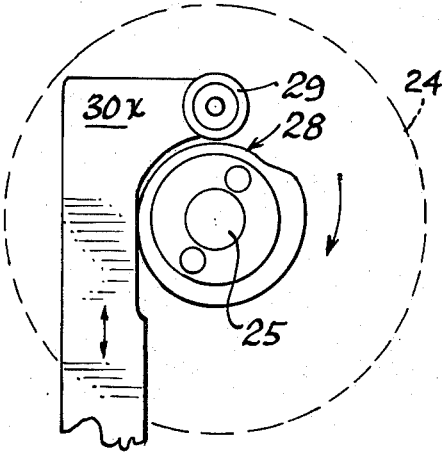
Figure 15:
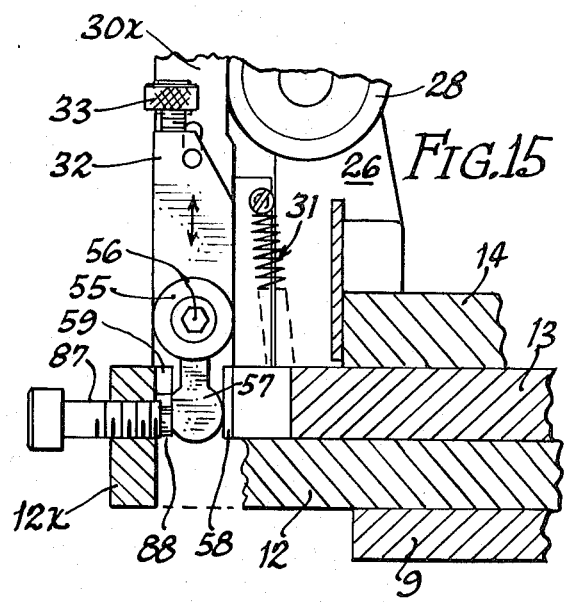
Figure 17:
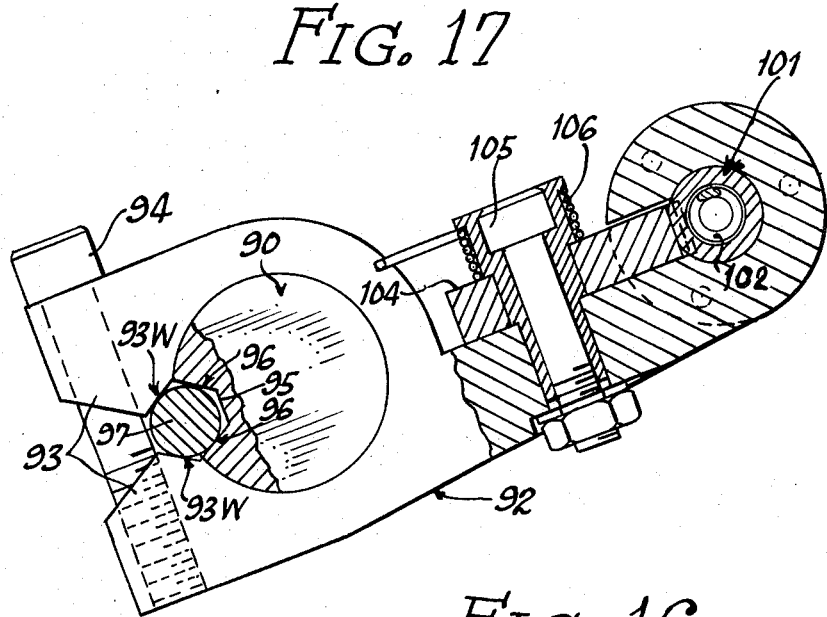
Figure 16:
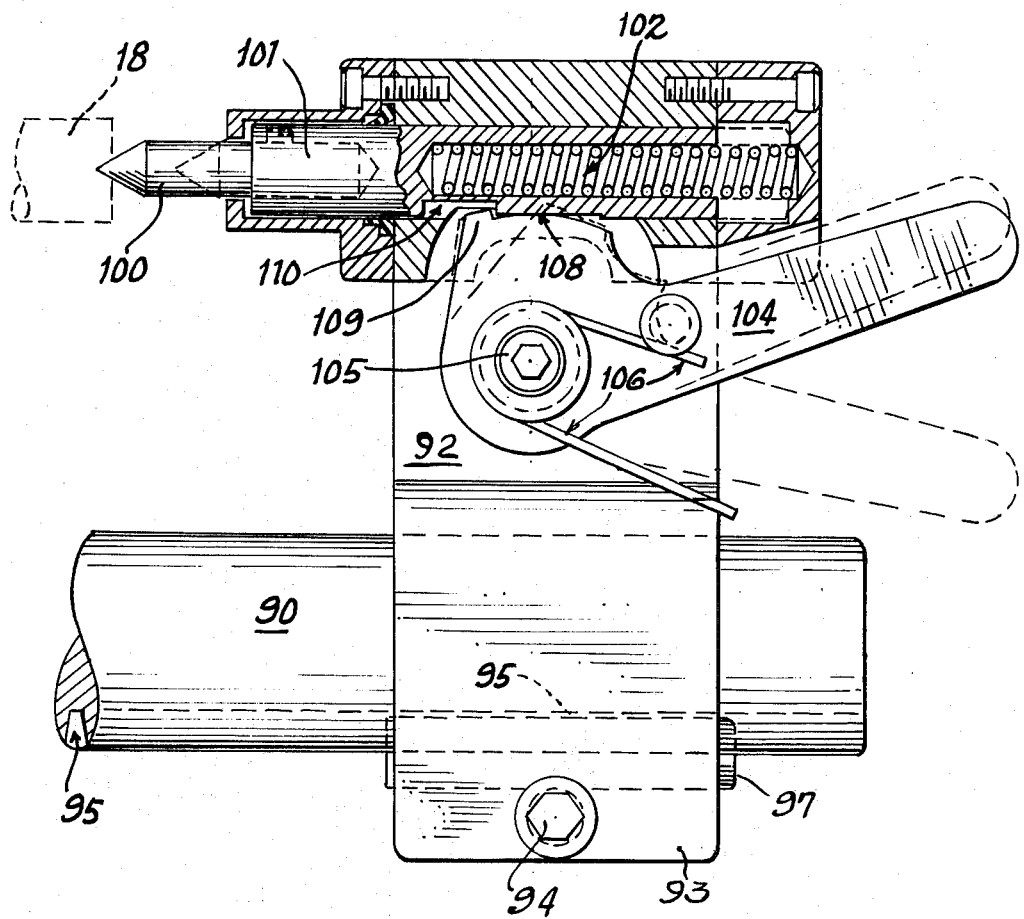

FIGS. 12 and 13 are complementary elevational views of the coupling crank means looking respectively along lines 12—12 and 13—13 of FIG. 15;

FIG. 14 is a fragmental elevational view of the sine slide drive for the lateral work head or headstock table;

FIG. 15 is a sectionalized fragmentary detail of the sine drive for the lateral work head table;

FIG. 16 is a plan view, partly in section, of the tailstock;

FIG. 17 is an endwise view, partly in section, along lines 17—17 of FIG. 16;

As depicted in FIG. 1, the two fixtures A and B are bedded and coupled for coaction on the table of a travelling carriage 10 of any suitable universal cutter-grinder. The grinding fixture B consists of a bed plate 12, a lower or longitudinal slide 13 and an upper or transverse slide 14. Spring means 13A retracts the lower slide toward the left to its home position, and another spring 14A retracts the upper slide at right angles thereto into its normal position (toward the viewer).

Mounted upon the upper slide table is a headstock 15 journalling the work spindle 16 which can be equipped with any desired type of work holder, center, collet or chuck 17, to engage the work piece illustrated as a spirally fluted drill 18.

The work spindle is rotated by a belt gear 22 and gear belt 23 driven from gear 24 on a cam spindle 25 also journalled on the upper slide by a pillow block 26. At one end of the cam spindle is a cam means 28 driving with roller means 29 to reciprocate a vertical translating sine slide means 30 likewise bedded on the upper slide and operative to impart dual crosswise linear motions to the work head, and therefore the spindle, independently of rotation of the latter, this dual translatory motion being achieved by sine roller means 34 engaging with an angularly settable sine member 35 which, cooperably with the spring means 14A and the rotation of cam 28 causes the upper slide to reciprocate laterally of the spindle to a degree determined by the setting of the sine member 35.

A further translating sine roller means 38 carried by the vertical sine slide 30 operates to reciprocate the lower table slide longitudinally cooperably with spring means 13A and action of the vertical slide 30 by cam 28.

The cam shaft or spindle 25 has a primary crank means 20 affixed to the end thereof, and a secondary crank means 40 is supported to rotate concentrically about the cam shaft along with a belt gear 24 shown connected thereto by a tubular shaft or bushing 47. Thus rotation of the smaller primary input crank 20 by the primary output shaft means 49 drives only the cam shaft 25 and its sine slide cam 28 to actuate the vertical slide 30; but the secondary input crank means 40 rotated from the secondary output shaft means 64 is joined with gear 24 and therefore rotates the latter and the work spindle at modulated speed independently of the cam 28.

Power for the described translatory movements of the cross-acting table slides is derived from the driving fixture A which includes a suitable electric motor means 42 and reduction gear means 43 mounted on a rigid frame means 44 carried on bed plate 45. The motor means drives a single main primary power shaft 48 having an extended spindle end portion 49 to which is affixed a smaller primary output crank disc 50 having a radial coupling slot 51 into which the coupling roller means 21 of the primary input crank 20 is insertible on axial alignment of the two fixtures in the juxtaposed manner depicted.

Thus, upon rotation of motor drive shaft 48 and its extended end spindle means 49, the smaller or primary output crank disc 50 is rotated, which in turn drives the smaller or primary input cam crank 20 to rotate the slide-actuating driving cam 28 and impart the described dual motions to the cross-acting table slides 13 and 14.

The work spindle 16 is rotated froom the primary power shaft means 48 only through a modulatable differential drive means C the output of which rotates a larger secondary output crank disc 60 also having a radial coupling slot 61 insertibly coupling with the coupling roller means 41 of secondary input crank 40.

The crank disc 60 is joined, as by the depicted tubular bushing 64, to a differential output gear 65 journalled in a planetary differential housing 66 rotatable about the common alignment axis of the motor power shaft 48, cam spindle 25, and the concentric coupling crank means 21, 50 and 41, 60.

The differential unit is equipped with an input differential gear 67 which is fast on the primary motor power shaft 48 and therefore driven directly by the motor, and the said input gear drives the differential output gear 65 through a set of intermediate planet gears 68A, 68B, also journalled on the housing or carrier body 66, the effect being to directly transmit the torque of the motor shaft 48 to the larger crank disc 60 when the planetary housing is stationary, and thus to drive the work spindle and the cam shaft simultaneously at the selected motor speed, since shaft portion 49 of primary shaft 48 is also rotating the cam shaft 25 through the smaller crank disc 50 and crank means 20.

Should the planetary housing 66 be caused to rotate, as by application of a modulating overdrive or torque thereto at gear 67, the speed of the differential output gear 65 would be increased or decreased accordingly depending upon the direction of the applied torque, and the speed of the work spindle would therefore be changed correspondingly, whereas the speed of the cam spindle 25 would remain unaffected since it is being driven directly and positively from the concentric primary shaft portion 49 rather than through the differential system.

Means for applying the desired degree of modulating or overdriving torque to the differential unit comprises a cross rack 70 driving a differential modulating gear 71 fast with the differential housing body 66 as represented schematically by bushing 69 so as to rotate freely and coaxially about the concentric power shaft 48, the rack 70 being affixed to a cross sine slide 72 bedded on the plate 45 in a manner such that movement of this slide in one or the other direction imparts through the rack 70 and modulating gear 71 an additive or subtractive torque to the planetary housing with consequent modification of the speed of rotation of the differential output gear 65.

Modulating force is applied to the differential slide 72 by a compact sine bar means comprising a small block 74 pivoted as at 75 and having a channel 76 constituting a camming race engaging a slide roller 78 affixed to the slide 72 in such manner that by setting the angular position of the sine block and preventing it from moving when the carriage 10 is advancing, the roller 78 will be cammed to shift the slide 72. The sine block is accordingly carried in slide bed 81 affixed to the support 44 so as to travel with the bed plate 45 and the carriage 10.

Stop means such as the adjustable arm 84 affixed to the carriage base 11 will be abutted by the sine bar slide 80 as the carriage moves forward so that the block sine bar 74 in effect stands still while the cross slide is carried forward, thereby producing the camming action with slide roller 78 which shifts the slide 72, the amount of this slide shift depending upon the angular setting of the sine block 74. Such an assembly affords a highly efficient and very compact differential drive means of great versatility and capable of performance equalling that of much larger and more costly spiral grinding machines heretofore known, this advance being in large part attributable to the concentric differential drive shaft and coupling crank system by which both the work spindle and slide table actuating means are actuated in the compound motion system described.

When both crank systems 21, 50 and 41, 60 are coupled, the compound motions applied to the work piece 18 consist in a lateral vibration radially of the spindle 16, a longitudinal vibration along the axis of spindle 16, a linear advance along the latter axis relative to the grinding wheel or other tool 19 as the carriage advances, a rotation about the axis of spindle 16 with either positive or negative torque or modulating overdrive applied through the differential system.

The differential driving fixture can be uncoupled from the grinding headstock fixture simply by separation of these units a small distance on the carriage table on loosening the usual hold-down bolt (not shown). But either driving function alone can be had by removably disabling one or the other of the driving cranks 20, 21 or 40, 41, for which purposes their respective rollers 21 and 41 are bolt-mounted as at 21B and 41B. In such case, the complex motion would be changed. For example, if the differential drive crank 40, 41 were disabled, the belt gear 24 would not be rotated and the work spindle 16 would not rotate but could then be turned by hand (e.g., to index spiral flutes) or rotated by a separate belt drive to the spindle gear 22 (not shown). If on the other hand the small power drive crank 20, 21 were disabled, the work spindle would continue to be rotated through the differential drive means, but the dual lateral displacements of the headstock, due to the two crosswise slide table motions, would be absent. Such selective modifications of the net complex movement of the work spindle have many uses in forming, dressing and relief grinding various types of tool with straight or helical flutes, with or without regard to the linear travel of the entire workhead by advance of the machine carriage 10, so that the described coaxial power drive and crank coupling features greatly extend the cooperative versatility of the fixtures.

Also of importance is the novel arrangement of the gear system in the differential drive unit C. In the schematic illustration of FIG. 2 only one set of the intermediate planet gears 68A, 68B is shown. In practice, two such sets are preferably employed to balance the unit dynamically, as indicated hereafter. Because of the extension of the motor shaft sections 48-49 continuing through the entire differential housing assembly coaxially with the differential or secondary output 64, it is not feasible to employ the conventional type of planetary differential gear which in the simplest form employs three (or four) bevel gears arranged as in the German patent to Zimmermann above referred to, not only because such gears are stem-mounted with only one bearing support, but because they are necessarily wider across a maximum diameter than spur gears and require considerably more mounting space in the carrier housing, and the conventional differential construction becomes unfeasibly complicated when a primary power shaft is conceived to be extended entirely through the differential system, as in the case of the disclosed novel power shaft means 48, 49, 64, 65.

In order for a differential system of the type disclosed to function, as by addition or subtraction of modulating torque through the disclosed rack and gear means 70, 71, it is necessary that the direction of rotation of the output gear 65 be the reverse of the rotation of the input gear 67; otherwise, where the system must work at a one-to-one input-output gear ratio, the device would not be a differential but a mere coupling with the carrier or housing rotating constantly with the power shaft. For such reasons, a unique gear arrangement, such as depicted schematically in FIG. 1 and further explained with reference to the vertical cross-section of FIG. 2, is necessary in conjunction with the traversing coaxial shaft means 48, 49, continuing on through the differential carrier or housing body.

Thus, referring to FIG. 2, the differential input gear will mesh only with a first intermediate or planetary gear 68A, which in turn is wide enough to mesh only with a second intermediate planetary gear 68B, and the latter then meshes only with the output gear 65, resulting in the necessary reversal of rotation leaving the carrier or housing 66 free to be differentially rotated by the modulating gear rack, as described. If the sine block 74 is set in the zero angle position in which the roller channel 76 is parallel to the direction of the carriage travel, the cam roller 78 is not affected and there will be no resultant shifting of the differential slide 72 and rack 70 and the differential housing will therefore stand still with the main shaft means 48–49 rotating the work spindle at the set speed of the precision motor unit.

Preferred working forms of construction and arrangement of components, shown and described generally in view of FIG. 1, are depicted in detail in FIGS. 3 through 17 wherein like reference numbers indicate like parts and then accompanied by the suffix X, e.g., 30X, indicate some change in form of interest.

Figure 5:
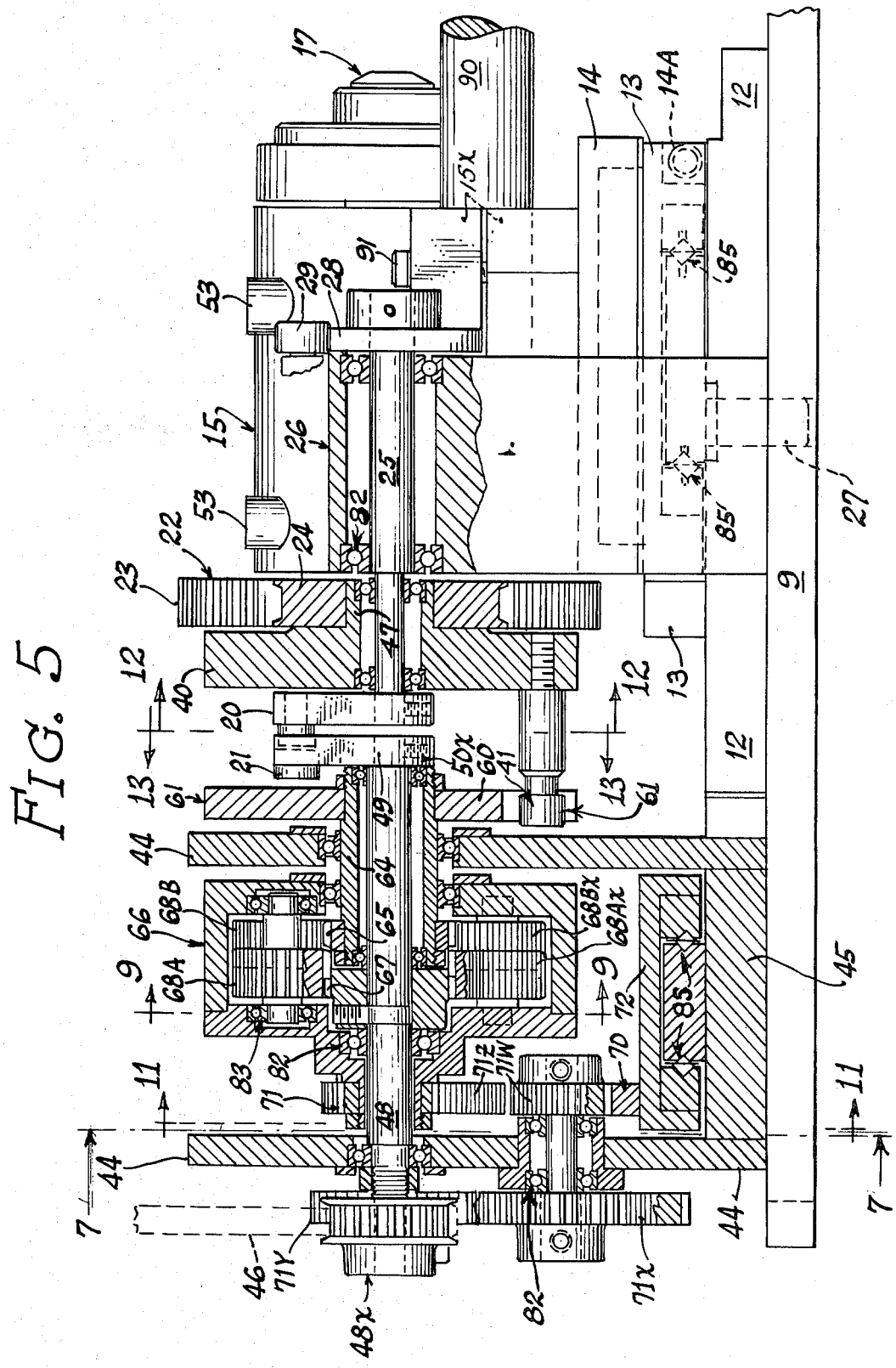

It is to be observed, according to FIG. 5, that the rotating shaft elements of the coupling gears and the power shaft means 25, 42, 48, 64, etc., as well as the spindles within the differential unit, are journalled for precision in ball bearings, as exemplified for instance at 82 and 83, it being understood that the headstock or work spindle 16 is similarly journalled (not seen). Likewise, the several table slides 13 and 14 and sine motion slides 30X, 72 and 80 are supported on roller bearings, as at 85 in FIGS. 5 and 7.

Figure 9:
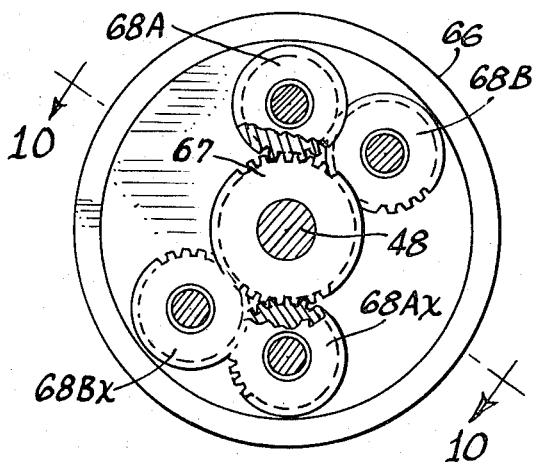

As previously mentioned under FIG. 2, the differential unit preferably employs a duplicate balancing set of the planet gears in the highely compact configuration shown in FIG. 9, which includes the described differential input gear 67 and planet gears 68A and 68B, together with an identical second set of planet gears 68AX and 68BX.

Figure 8:
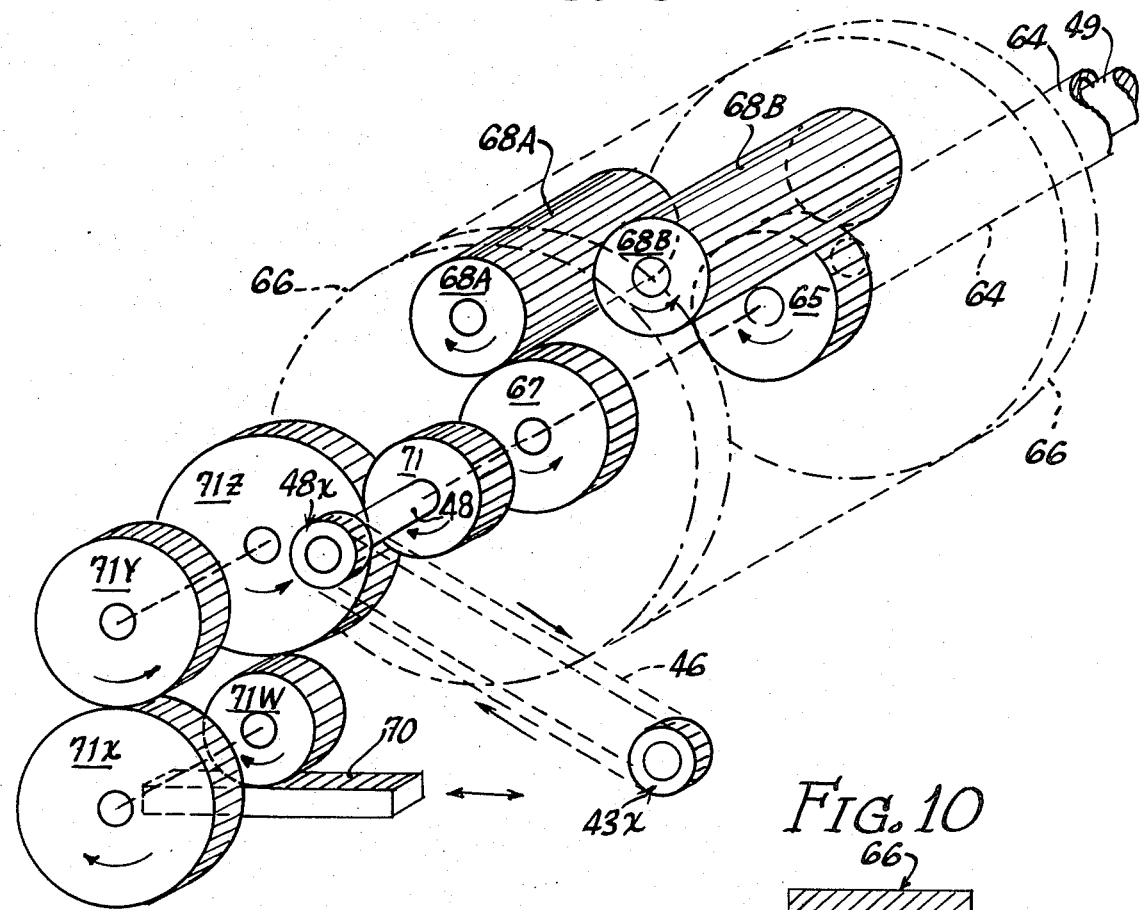
Figure 10:
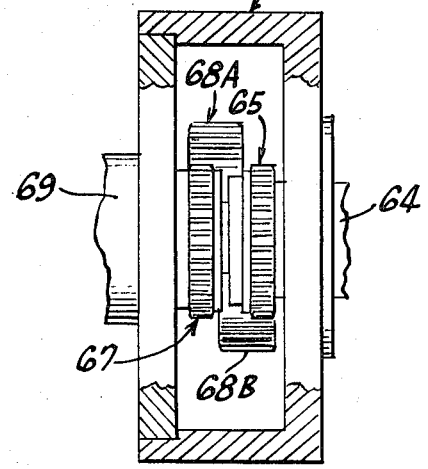
Figure 11:
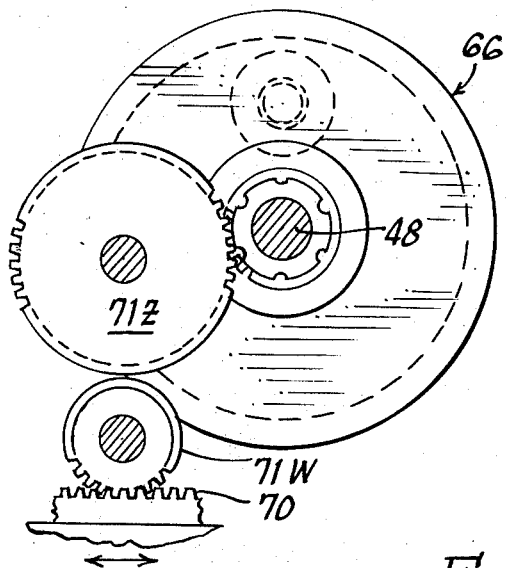

The typical configuration and relative positioning in the housing 66 of the planet gears of either set in their relation to the input and output shafts and gears is illustrated by the gear sets 68AX and 68BX, seen in the median sectional view of FIG. 10 looking along the lines 10—10 of FIG. 9, and the driving sequence typical of eithe set is also illustrated schematically in FIG. 8 in relation to the other gear elements of the complete differential power train of the driving fixture.

Figure 6:
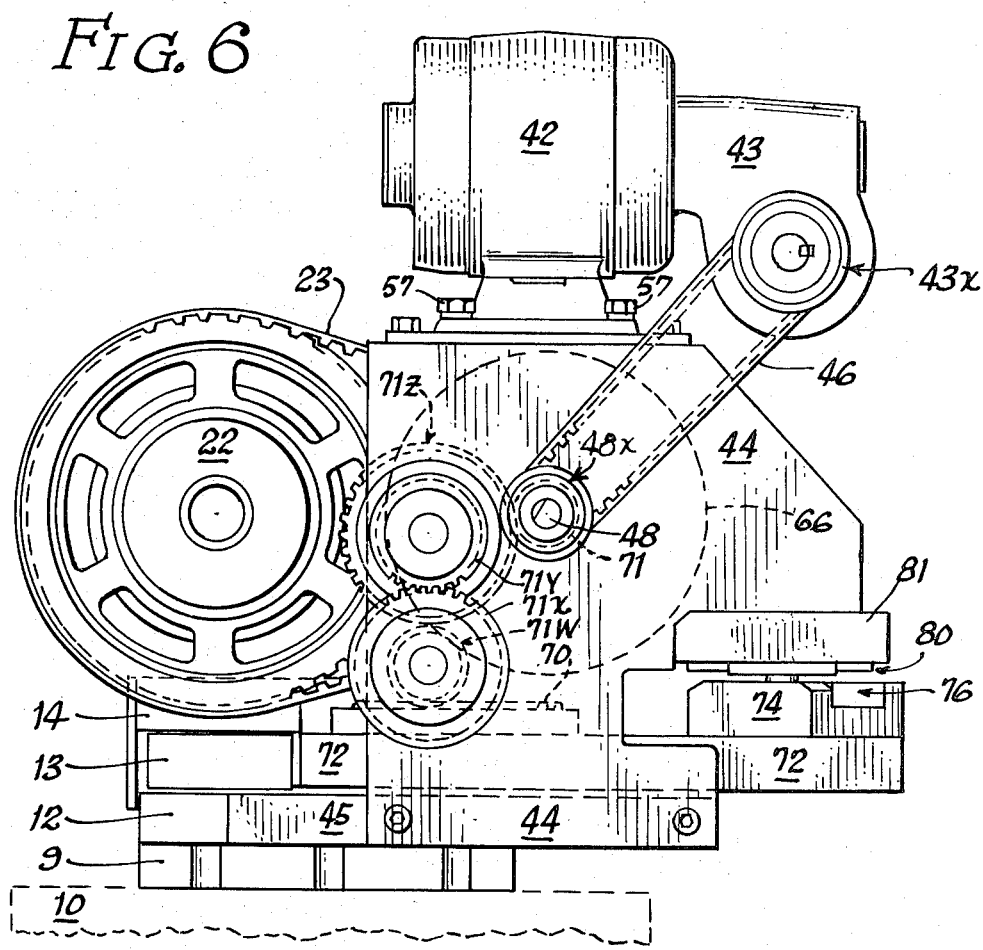
Figure 7:
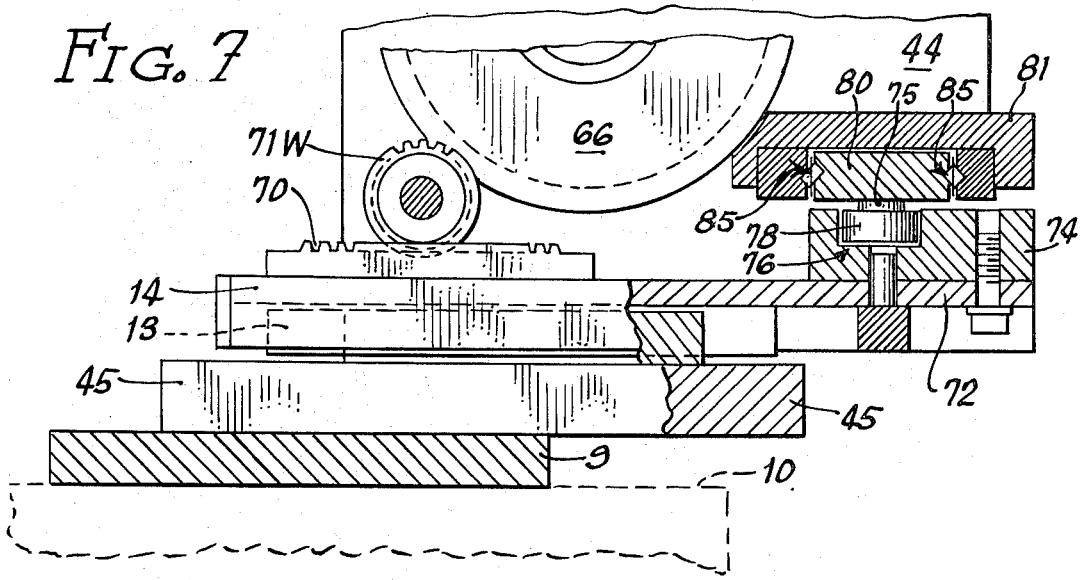

As a further aspect of the highly compact character of the components of the working embodiment, it will be observed in FIGS. 3 and 5 that the differential driving fixture is mounted on its own bed plate 45, and the motor unit 42–43 is removably attached as at 52 on a platform supported upon the upright plates 44 overlying the differential unit 66, the output spindle 43X of the reduction gear driving the main or primary power shaft 48, 49 through gear belt means 46, as seen to advantage in FIG. 6, which also depicts the disposition of the train of intermediate gears 71W, 71X, 71Y, 71Z, which couple the modulating gear rack 70 with the differential housing gear 71 in this compact configuration.

The modulating cross slide 72 (FIGS. 3, 5) is likewise compactly contrived to work directly beneath the differential unit 66, with the principal sine slide 80 working at right angles thereto immediately above the foreward end of the cross slide and its sine block 74, slide 80 being provided with a contact rod 84X engageable with the fixed stop means 84.

The concentric coupling crank means 21, 50 and 41, 60 of FIG. 1 may take the form shown in the complementary views of FIGS. 12 and 13 showing the corresponding parts of the working embodiment in which the small primary, direct-drive crank coupling disc 50 is made still smaller in the form of a yoke 50X, said coupling crank member 21, 50X and 41, 60, as seen in FIGS. 3 or 5, being very compactly juxtaposed in between the closely confronting portions of the driving and grinding fixtures and being respectively operative in the manner first explained to transmit direct and modulated driving torque to the work spindle and the translatory sine slide means for shifting the two table slides 13 and 14.

In order that the grinding fixtures may be employed for operations which do not involve a spiral or helical lead, the bed plate 12 can be swung about the bed pivot 27 in the long machine bedding plate 9 to cause separation of the cranks 21 and 41 from their respective coupling slots 51X and 61, in which case the motor unit 42–43 will be transferred to the work head casting 15 and seated upon tapped posts 53 formed thereon for this purpose, the motor drive belt 46 in such case being replaced by another which will be trained over the reduction output gear 43X, the work spindle drive gear 22, and the cam shaft gear 24 in a triangular driving configuration (not illustrated).

With the object of making the compound translating sine drive means 34, 35 and 38, 39 of FIG. 1 a highly compact unitary structure, the direction of movement of the lower and upper table slides 13X and 14X relative to each other in the working embodiment is the reverse of that described under FIG. 1, the purpose and essential principle of operation of these tables in producing vibratory radial (lateral) and axial (longitudinal) translation of the work spindle and work piece 18 being identical in either case.

Thus, as viewed in FIG. 3, the working embodiment of the compound translatory sine movement mechanism comprises the sine bar 39X pivoted on block 36 attached to the vertically reciprocable sine slide 30X, the driving roller 29 of which overlies the crank-driven cam means 28 in the manner shown to enlarged scale in FIG. 14. By adjusting the sine bar relative to a scale on block 36, FIG. 3, (calibrated in thousandths) the axial or longitudinal displacement of the upper table 14 and headstock thereon can be regulated from zero to about .250 inch responsive to vertical reciprocation of the translating slide 30X by action of cam 28 and the retractive action of the spring 31 seen in FIG. 15, which also depicts the drive means for shifting the lower slide table 13 responsive to the same kind of motivation present in the schematic roller and sine block means 34, 35 of FIG. 1, but more compactly arranged as follows.

Referring to FIG. 15, an elongated mounting block 32 is adjustably carried on the side of the sine slide 30X and provided with a vertical adjusting screw means 33 to provide support for a pendant wedge-type cam member 55 pivoted as at 56 on the side thereof and having an enlarged hardened rub member 57 fused thereto at the lower end thereof and constituting the wedge cam which is disposed between a second hardened rub block 58 affixed to the slide 13 on one side and a third and smaller rub member 59 secured to a relatively stationary block 12X affixed to the stationary bed plate 12 (FIG. 3 also), the operation being such that as the pendant wedge cam portion 57 rises and falls with slide 30X, the rub element 57 wedges between the two flanking rub elements 58 and 59 to shift the lower table 13 laterally in degree depending upon the setting of a principal adjustment screw 87 having a hardened insert anvil 88 which positions the starting position of the pendant member relative to the fixed rub member 59, whereby a very sensitive and constant magnitude of radial (lateral) reciprocation of vibration of the work head is assured. The wedge 57 also has freedom of movement to slide back and forth (axially) between the rub blocks 58, 59 when the upper slide 14 reciprocates axially, i.e., longitudinally.

A feature of the working embodiment of the apparatus not described in the schematic presentation relates to the provision of a precision tailstock means comprising a long cylindrical extension rod 90 running alongside of the head stock 15, as seen in FIGS. 4 and 16, and clamped at one end between split clamping jaws 15X forming part of the headstock casting and drawn closed by clamp bolts 91 (FIG. 5 also).

Adjustably positionable along this rod toward the far end thereof, FIG. 16, is a tailstock support 92, comprising a cylindrical rod clamp with split clamping legs 93, FIG. 17, adapted to seize the rod 90 when drawn together by clamp bolt 94.

Formed along one side of the rod is a precision machine locating channel 95 having side walls 96 convergent toward the center of the rod and the root of the channel and the rotative axis of the work spindle and work piece, e.g., a tool 18.

Oppositely convergent wall portions 93W are machined precisely in the two clamp jaw legs to engage a precision cylindrical insert 97 with a resultant drawing of the tailstock center 100 up to the precise line of the work axis responsive to tightening of the clamp bolt 94.

As viewed in FIG. 17, the tailstock center 100 includes a plunger portion 101 slidable in a cylindrical bore against the action of a compression spring 102 urging the center constantly outward to its limit into engagement with the work piece. A clamp lever 104 pivoted as at 105 is urged by spring means 106 to thrust a radially offset cam face 108 against the plunger in a manner to lock the same against retraction from the work while permitting the lever to pivot clockwise and retract the plunger and center from the work as the result of engagement of a tooth 109 at the end of the cam in a notch 110 formed in the plunger. Thus the tailstock is constantly spring-urged against the work but locked by camming action at 108 against displacement away from the work except in response to intentional retraction by the clockwise pivoting of lever 104.

We claim:

1. Apparatus for form grinding, relieving, backing off and like operations on spiral or straight-fluted tools wherein a work spindle is rotated by differential gear means at selected constant and differentially-modulated speed and also translated radially and axially by reciprocable table means carrying the work spindle, and characterized by the provision of a driving fixture and a grinding fixture cooperative therewith in a predetermined coaxial juxtapositioning thereof, said driving fixture having coaxially rotatable primary and secondary output drives, the primary drive being directly rotated from a primary shaft motor-driven at selected constant speed and the secondary output drive differentially driven from the primary shaft by planetary differential gear means arranged in a carrier which is axially penetrated by and coaxially rotatable about said primary shaft and which constitutes the driving source of said secondary output drive, said carrier being rotatable by modulating drive means to modify the speed of said secondary output drive from said constant speed; the grinding fixture including a headstock with work spindle carried by table means reciprocable axially and radially of the work spindle axis and carrying translating sine drive means for reciprocating the table means together with coaxial rotary primary and secondary input drives coupling with the corresponding primary and secondary output drives of the driving fixture in the coaxial juxtapositioned relationship aforesaid, said primary input drive driving said translating sine drive means and said secondary input drive driving said work spindle.

2. Grinding apparatus according to claim 1 wherein said differential gear carrier has coaxial input and output gears spaced apart axially, and both coaxially traversed by said primary shaft, the input gear being fast with said shaft to rotate therewith and the output gear being fast with the carrier and rotating freely about said shaft, said carrier further having a modulating gear fast therewith and freely coaxially rotatable about said primary shaft, at least one pair of planet gears journalled in the carrier and driving with each other and each driving with a different one of said input and output gears in operation such that said output gear rotates at the primary constant speed when the carrier is stationary about the common axis, and at modulated speed when the carrier is turned by modulating torque applied to said modulating gear.

3. Grinding apparatus accrding to claim 2 further characterized in that said driving fixture includes a bed plate with means supporting said differential carrier at an elevation thereabove, and sine drive modulating means disposed beneath the carrier and comprising a modulating gear rack reciprocable on a first lower slide means transversely of said common axis to rotate said modulating gear; together with upper modulating slide means disposed to reciprocate in parallelism with said common axis at a level overlying said lower slide means and transversely of the latter and having sine block means provided with a sine roller channel and pivotable for angular setting thereon about a vertical axis normal to the plane of movement of the upper slide means; sine roller means connected to the upper slide means and working in said channel to shift in degree depending upon the angular setting of said sine block means responsive to shifting of the upper slide means; said upper slide being adapted to be shifted by stationary stop means while said apparatus is travelled on a linearly moving machine carriage.

4. Apparatus according to claim 1 further characterized by the provision of means for coupling the primary and secondary output drives of the driving fixture with the corresponding input drives of the grinding fixture in the manner aforesaid, any comprising coaxially rotatable primary and secondary output crank means respectively rotated by said primary and secondary drives of the driving fixture, together with cooperative primary and secondary coaxially rotatable input crank means respectively connecting with the said primary and secondary input drives of the grinding fixture in the coaxial juxtaposed relationship of said fixtures aforesaid.

5. Apparatus according to claim 4 further characterized in that the crank means of one of said fixtures comprises a primary and a secondary coaxially rotatable radial crank arm each having coupling roller means disposed at a radius from the axis of concentricity which is different from the radial disposition of the roller means on the other, and the crank means on the other fixture comprises a complementary set of primary and secondary concentrically rotatable crank elements each having a radial coupling slot disposed to receive a corresponding one of said primary or secondary crank rollers to drive therewith in said juxtaposed relation of the fixtures.

6. Grinding apparatus as set forth in claim 5 further characterized in that said fixtures are mounted on a bedding plate and at least one of the same is pivotable about an axis normal to the plane of such plate in a manner to move to and from said juxtaposed relationship with the other fixture, and said coupling crank means is so disposed relative to said pivot axis as to engage said crank roller means in or withdraw the same from the corresponding coupling slots of the complementary coupling means responsive to turning of the pivotally mounted fixture a predetermined amount relative to the other, whereby the primary and secondary output drives of the driving fixture may be disconnected from the corresponding input drives of the grinding fixture to free the latter for cooperation with other drive means.

7. Grinding apparatus according to claim 1 wherein said table means comprises a pair of relatively transversely reciprocable slide tables each independently spring-driven to a home position and each shifted therefrom and released for spring-return to said position by action of said translating sine drive means to produce the radial and axial translation of the work spindle as aforesaid.

8. Apparatus according to claim 7 further characterized in that said translating sine drive means comprises a vertically reciprocable translating slide carried by said table means together with driven means actuated thereby and connecting with each said slide table to shift each of the same in action as aforesaid responsive to reciprocation of said translating slide; and means drivingly interconnecting said translating slide with said primary input drive for reciprocation by the latter at the constant speed thereof when driven by said primary output drive in the coaxially juxtaposed relationship of the fixtures aforesaid.

9. Apparatus according to claim 8 wherein the driven means for at least one of said slide tables comprises a roller affixed therewith and drivingly engaging an angularly adjustable sine block affixed to said translating slide to shift said roller and the appertaining table responsive to reciprocation of the slide and in magnitude depending upon the angular adjustment of said sine block.

10. Apparatus according to claim 8 wherein the driven means for at least one of said slide tables comprises a vertically reciprocated wedge cam driven by said translating slide and acting between a fixed rub surface and an oppositely located rub surface on such table in a manner operative in one direction of movement of the translating slide to wedge the table away from said home position and release the table for spring-return to said position responsive to opposite movement of the slide.

11. The construction of claim 10 further characterized in that said wedge cam is pivotally supported relative to the translating slide for movement of a wedging part thereof toward and away from said rub surfaces in the direction of movement of the table whereby to modify the magnitude of reciprocatory shifting of such table, there being adjusting means operative to determine the pivotal position of said wedge cam relative to the fixed one of said rub surfaces, at least.

12. Apparatus according to claim 1 wherein the headstock work spindle is provided with a tail stock comprising a tailstock support movable along a rigid elongated arm extending in parallelism with the axis of rotation of the work spindle; a center plunger slideable in said support in direct alignment with said axis to engage the work piece turned by said work spindle; spring means urging said plunger axially toward said work spindle for centering engagement with the work piece; a plunger lock comprising a locking cam movably mounted on said support and spring-urged to thrust a cam portion thereon into binding engagement with a side portion of said plunger such that the plunger is permitted at all times to move by action of said first spring means toward the work piece, but is bound against the opposite movement away from the work piece by such binding engagement; detent means on the cam member engageable with the plunger to retract the same from the work piece responsive to movement of the cam member in a direction opposite from its direction of movement into binding engagement as aforesaid, and lever means operative to move the cam member in releasing action as aforesaid.

13. The construction defined in claim 12 further characterized by the provision of tailstock centering means wherein said elongated arm is a cylindrical rod and said tailstock support includes opposite clamping jaw portions adapted to seize said rod on opposite sides thereof, said rod on a remote side thereof diametrically opposite from said support and tailstock center having a longitudinally-extending channel with opposite side wall portions directed at equal angles toward the center of the rod, each of said jaw portions having an opposite side wall portion adjoining one of the first-mentioned convergent wall portions directed convergently at equal angles toward the side of the rod remote from its center; a cylindrical insert fitting into said channel to engage tangentially with all of said side wall portions and exert a centering thrust upon said support in a direction which tends to force the support to move the center of the plunger up to but never beyond the center line axis of the work piece responsive to clamping action of said jaw portions; and means operative to urge said jaws in clamping action as aforesaid.

14. In a grinding machine having a work spindle with a normal speed of rotation subject to modulation by addition of an additive or subtractive torque thereto, and means providing additional motion components; differential drive means comprising a power shaft and a differential driving means coupling said shaft to provide normal and modulated torque to said work spindle, said differential driving means comprising a planetary housing rotatable about the axis of said shaft and penetrated by the shaft along said axis; an input gear fast on said shaft in said housing; an output gear free on said shaft in the housing; a first planet gear driven from said input gear, a second planet gear driven from said first planet gear and driving said output gear; a modulating gear rotatable freely about said shaft and fast with said housing for rotation therewith about the axis of the shaft therethrough; a modulating gear rack shiftable transversely of the shaft axis and driving said modulating gear; means for shifting said gear rack transversely back and forth for the purpose of applying modulating torque to the output gear through the intermediary of said planet gears; means coupling said output gear with said work spindle; and means coupling said shaft to said means providing additional motion components to the work spindle as aforesaid.

* * * * *

UNITED STATES PATENT OFFICE
CERTIFICATE OF CORRECTION

Patent No. 3,797,175                    Dated March 19, 1974

Inventor(s) FRANK G. NICOLAUS and CHARLES T. BREITENSTEIN

It is certified that error appears in the above-identified patent and that said Letters Patent are hereby corrected as shown below:

Column 10, line 48, (Claim 4), "any" should read --and--.

Signed and sealed this 30th day of July 1974.

(SEAL)
Attest:

McCOY M. GIBSON, JR.
Attesting Officer

C. MARSHALL DANN
Commissioner of Patents